US012754961B2

(12) United States Patent
Taguchi

(10) Patent No.: US 12,754,961 B2
(45) Date of Patent: Oct. 6, 2026

(54) DATA MANAGEMENT APPARATUS, DATA MANAGEMENT METHOD, AND NON-TRANSITORY RECORDING MEDIUM

(71) Applicant: Daigo Taguchi, Kanagawa (JP)

(72) Inventor: Daigo Taguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/058,954

(22) Filed: Nov. 28, 2022

(65) Prior Publication Data

US 2023/0297628 A1 Sep. 21, 2023

(30) Foreign Application Priority Data

Mar. 18, 2022 (JP) ................................ 2022-044203

(51) Int. Cl.
*G06F 16/93* (2019.01)
*G06F 16/23* (2019.01)

(52) U.S. Cl.
CPC .............. *G06F 16/93* (2019.01); *G06F 16/23* (2019.01)

(58) Field of Classification Search
CPC ................................ G06F 16/93; G06F 16/23
See application file for complete search history.

(56) References Cited

U.S. PATENT DOCUMENTS

2008/0243831 A1 10/2008 Kunitake
2014/0347690 A1* 11/2014 Sato ...................... G06F 3/1204 358/1.15
2021/0014371 A1* 1/2021 Utoh .................. H04N 1/00411
2022/0272209 A1* 8/2022 Yoneda ................ H04N 1/0097

FOREIGN PATENT DOCUMENTS

JP 2008-257317 10/2008
JP 2008-259211 10/2008
JP 2019-164441 9/2019

OTHER PUBLICATIONS

Japanese Office Action for 2022-044203 mailed on Nov. 18, 2025.

* cited by examiner

*Primary Examiner* — Aleksandr Kerzhner
*Assistant Examiner* — Samuel C Sharpless, III
(74) *Attorney, Agent, or Firm* — IPUSA, PLLC

(57) ABSTRACT

A data management apparatus includes circuitry to transmit first data stored in a memory in association with first identification information via a network to an information processing apparatus that executes predetermined processing on data, receive, from the information processing apparatus, second identification information added to the first data by the information processing apparatus, store the first identification information and the second identification information in the memory in association with each other, in response to completion of the predetermined processing on the first data, receive second data obtained by the information processing apparatus executing the predetermined processing on the first data and the second identification information from the information processing apparatus, and store, in the memory, the second data received from the information processing apparatus in association with the first identification information stored in association with the second identification information received from the information processing apparatus.

11 Claims, 12 Drawing Sheets

| NO. | STARTING TRIGGER | FLOW 1 | FLOW 2 |
|---|---|---|---|
| 1 | SAVING DOCUMENT | EXAMINATION BY USER "A" | APPROVAL BY USER "B" |
| 2 | SAVING DOCUMENT | SENDING DOCUMENT TO DOCUMENT PROCESSING SERVER | ACQUIRING PROCESSED DOCUMENT IN RESPONSE TO COMPLETION NOTIFICATION FROM DOCUMENT PROCESSING SERVER |

FIG. 9

| DOCUMENT ID | DOCUMENT TYPE | CONTRACT START DATE | CONTRACT END DATE | EXTERNAL DOCUMENT ID | PROCESSED DOCUMENT ID | … |
|---|---|---|---|---|---|---|
| 111 | MASTER CONTRACT | 2021/08/01 | 2022/07/31 | – | – | |
| 222 | BUSINESS CONTRACT | 2021/09/01 | 2022/08/31 | – | – | |
| 333 | MEMORANDUM | 2021/10/10 | 2023/10/31 | – | – | |

FIG. 11A

| DOCUMENT ID | EXTERNAL DOCUMENT ID | PROCESSED DOCUMENT ID |
|---|---|---|
| ID-A | - | - |
| ... | ... | ... |

FIG. 11B

| DOCUMENT ID | EXTERNAL DOCUMENT ID | PROCESSED DOCUMENT ID |
|---|---|---|
| ID-A | ID-B | - |
| ... | ... | ... |

FIG. 11C

| DOCUMENT ID | EXTERNAL DOCUMENT ID | PROCESSED DOCUMENT ID |
|---|---|---|
| ID-A | ID-B | ID-C |
| ... | ... | ... |

DATA MANAGEMENT APPARATUS, DATA MANAGEMENT METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-044203, filed on Mar. 18, 2022, in the Japan Patent Office, the entire disclosure of which is hereby incorporated by reference herein.

BACKGROUND

Technical Field

The present disclosure relates to a data management apparatus, a data management method, and a non-transitory recording medium.

Related Art

A document management system for electronically managing data such as a document is used. Also, a document processing system for executing predetermined processing on data is used. An information processing apparatus included in such a document processing system executes the predetermined processing on the document managed by a document management apparatus included in such a document management system in cooperation with each other.

For example, there is known a document management system including an information processing apparatus that switches document processing operations based on metadata added to an electronic document or electronic data.

SUMMARY

In one aspect, a data management apparatus includes circuitry to transmit first data stored in a memory in association with first identification information via a network to an information processing apparatus that executes predetermined processing on data, receive, from the information processing apparatus, second identification information added to the first data by the information processing apparatus, store the first identification information and the second identification information in the memory in association with each other, in response to completion of the predetermined processing on the first data, receive second data obtained by the information processing apparatus executing the predetermined processing on the first data and the second identification information from the information processing apparatus, and store, in the memory, the second data received from the information processing apparatus in association with the first identification information stored in association with the second identification information received from the information processing apparatus.

In another aspect, a data management method includes transmitting first data stored in a memory in association with first identification information via a network to an information processing apparatus that executes predetermined processing on data, receiving, from the information processing apparatus, second identification information added to the first data by the information processing apparatus, storing the first identification information and the second identification information in the memory in association with each other, in response to completion of the predetermined processing on the first data, receiving second data obtained by the information processing apparatus executing the predetermined processing on the first data and the second identification information from the information processing apparatus, and storing, in the memory, the second data received from the information processing apparatus in association with the first identification information stored in association with the second identification information received from the information processing.

In another aspect, a non-transitory recording medium carrying computer readable codes for controlling a computer system to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 9 is a table illustrating an example of metadata according to one embodiment of the present disclosure;

FIGS. 11A, 11B, and 11C are tables illustrating examples of setting contents of metadata according to one embodiment of the present disclosure;

Figure 1:
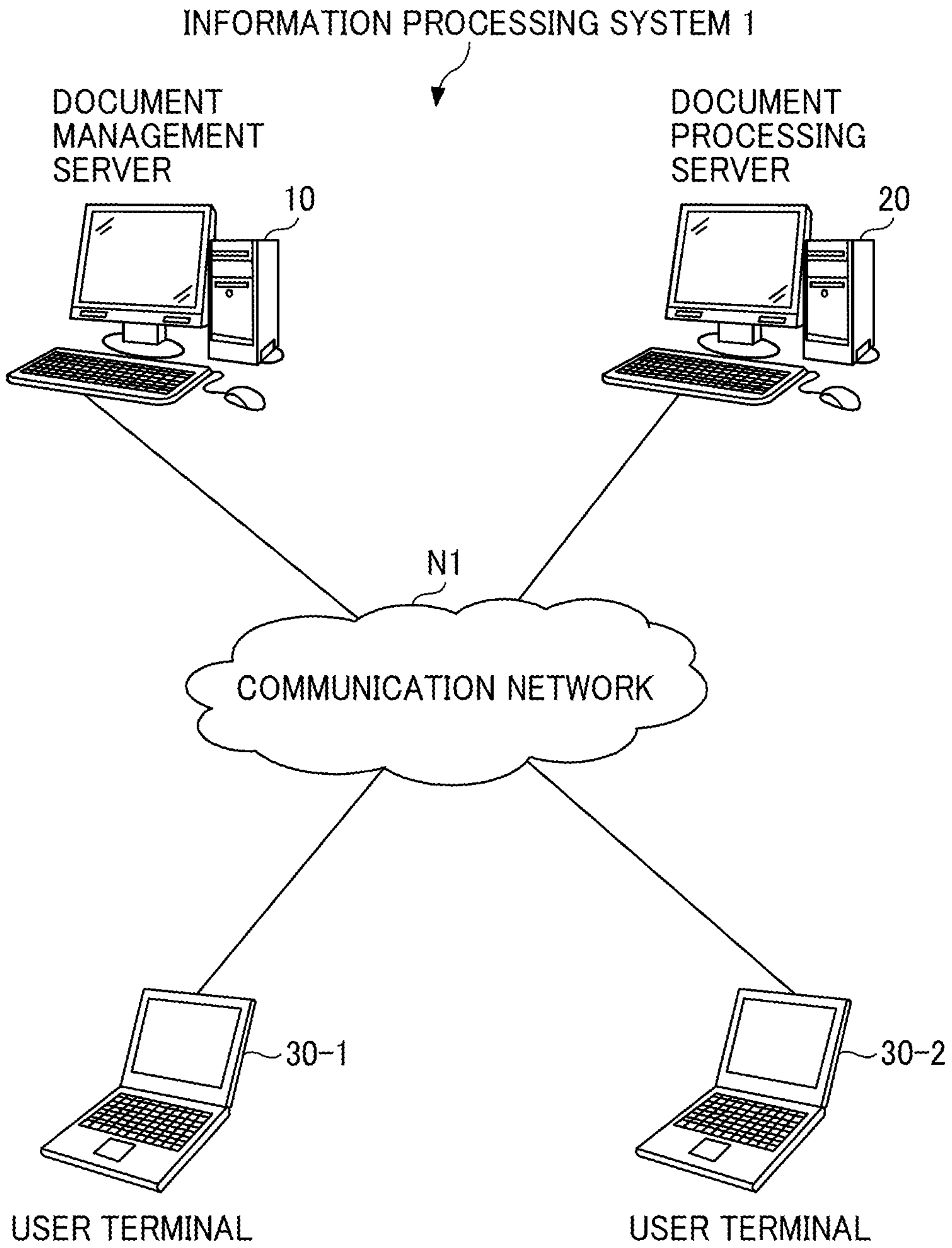
FIG. 1 is a schematic diagram illustrating an overall configuration of an information processing system according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, one embodiment of the present disclosure is described in detail with reference to the drawings. In the description of the drawings, the same elements are denoted by the same reference numerals, and redundant descriptions thereof are omitted.

According to an aspect of the present disclosure, an information processing system includes a document management server that manages documents and a document processing server that executes predetermined processing on documents, which communicate with each other via a communication network. In the information processing system according to the present embodiment, the document processing server executes the predetermined processing on the documents managed by the document management server in cooperation with each other.

The document management server acquires a document on which the document processing server has executed the predetermined processing and stores the document in association with the document on which the document processing server has not executed the predetermined processing. Hereinafter, the document on which the document processing server has executed the predetermined processing is also referred to as a "processed document." Similarly, the document on which the document processing server has not executed the predetermined processing is also referred to as an "unprocessed document." In addition, the document management server outputs a browsing screen that presents the unprocessed document and the processed document in association with each other.

The document according to the present embodiment is an example of electronic data representing the contents of the document or the like. The electronic data managed by the document management server represents the contents of not only a document but also any information such as a text, an image, or a moving image.

The document processing server according to the present embodiment is an electronic contract system that electronically concludes a contract using electronic data representing the contract and embeds an electronic signature in the contract. Note that the processing to be executed by the document processing server is not limited to the processing to electronically conclude a contract, and may be any processing to be electronically executed on a document.

Overall Configuration of Information Processing System

A description is given of an overall configuration of the information processing system according to the present embodiment with reference to FIG. 1. FIG. 1 is a schematic diagram illustrating an example of the overall configuration of the information processing system according to the present embodiment.

As illustrated in FIG. 1, an information processing system 1 according to the present embodiment includes a document management server 10, a document processing server 20, a user terminal 30-1, and a user terminal 30-2. The user terminal 30-1 and the user terminal 30-2 are referred to as user terminals 30 when the user terminal 30-1 and the user terminal 30-2 are referred to without distinction or collectively, and one thereof is referred to as a user terminal 30.

The document management server 10, the document processing server 20, and the user terminals 30 are connected to a communication network N1. Each apparatus or device is communicably connected to one another via the communication network N1.

The communication network N1 is implemented by, for example, a wired communication network such as the Internet, a local area network (LAN), or a wide area network (WAN). The communication network N1 may include not only the wired communication network but also a wireless communication network such as a wireless LAN or a short-range wireless communication, or a mobile communication network such as Worldwide Interoperability for Microwave Access (WiMAX), Long Term Evolution (LTE), or the fifth generation (5G).

The document management server 10 electronically manages a document generated in business. The document management server 10 stores metadata and the document in association with each other to enable efficient retrieval of the document. In addition, the document management server 10 has a function of executing a workflow for doing business, and efficiently enables, for example, a document circulation flow.

The document management server 10 may be implemented by one information processing apparatus or may be a system implemented by a plurality of information processing apparatuses.

The document processing server 20 electronically executes predetermined processing on a document. The document processing server 20 is, for example, an electronic contract system, a time stamp system, a noise removal system, a digital watermarking system, or the like.

The electronic contract system is a system for electronically concluding a contract using electronic data representing the contract and embedding an electronic signature in the contract. The time stamp system is a system for adding a timestamp identifying when processing is executed to a document in order to prevent falsification of the document. The noise removal system is a system for removing noise from a document. The digital watermarking system is a system for adding a digital watermark to a document.

The document processing server 20 may be implemented by one information processing apparatus or may be a system implemented by a plurality of information processing apparatuses.

The user terminal 30-1 is an electronic device used by a person (a requester) who uses the document management server 10. The requester operates the document management server 10 by using the user terminal 30-1.

The user terminal 30-2 is an electronic device used by a person (a processing executor) who uses the document processing server 20. The processing executor operates the document processing server 20 by using the user terminal 30-2.

An example of the document management server 10, the document processing server 20, and the user terminals 30 is a computer. Another example of the user terminals 30 is an image forming apparatus such as a printer, a facsimile machine, a digital multifunction peripheral/product/printer (MFP), or a scanner. Note that each of the document management server 10, the document processing server 20, and the user terminals 30 may be any information processing apparatus or image forming apparatus having a communication function.

Each of the user terminals 30 may be, for example, a projector, an interactive white board (IWB; an electronic white board having a blackboard function capable of mutual communication), an output device such as a digital signage, a head-up display (HUD) device, an industrial machine, an imaging device, a sound collecting device, a medical device, a network home appliance, an automobile (connected car), a laptop personal computer (PC), a mobile phone, a smartphone, a tablet terminal, a game console, a personal digital assistant (PDA), a digital camera, a wearable PC, or a desktop PC.

Hardware Configuration of Information Processing System

Figure 2:
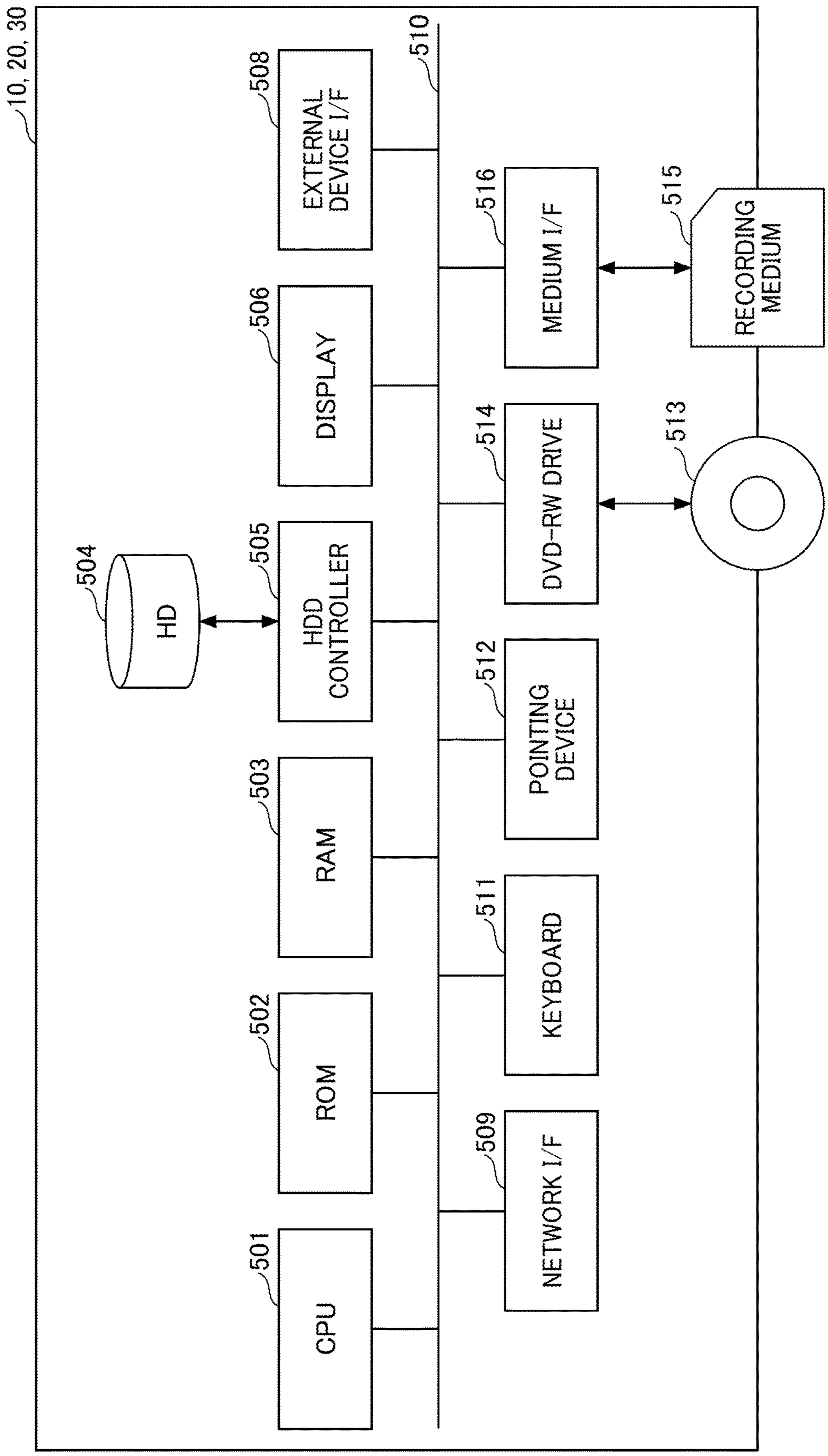
FIG. 2 is a block diagram illustrating a hardware configuration of a computer according to one embodiment of the present disclosure.
Figure 3:
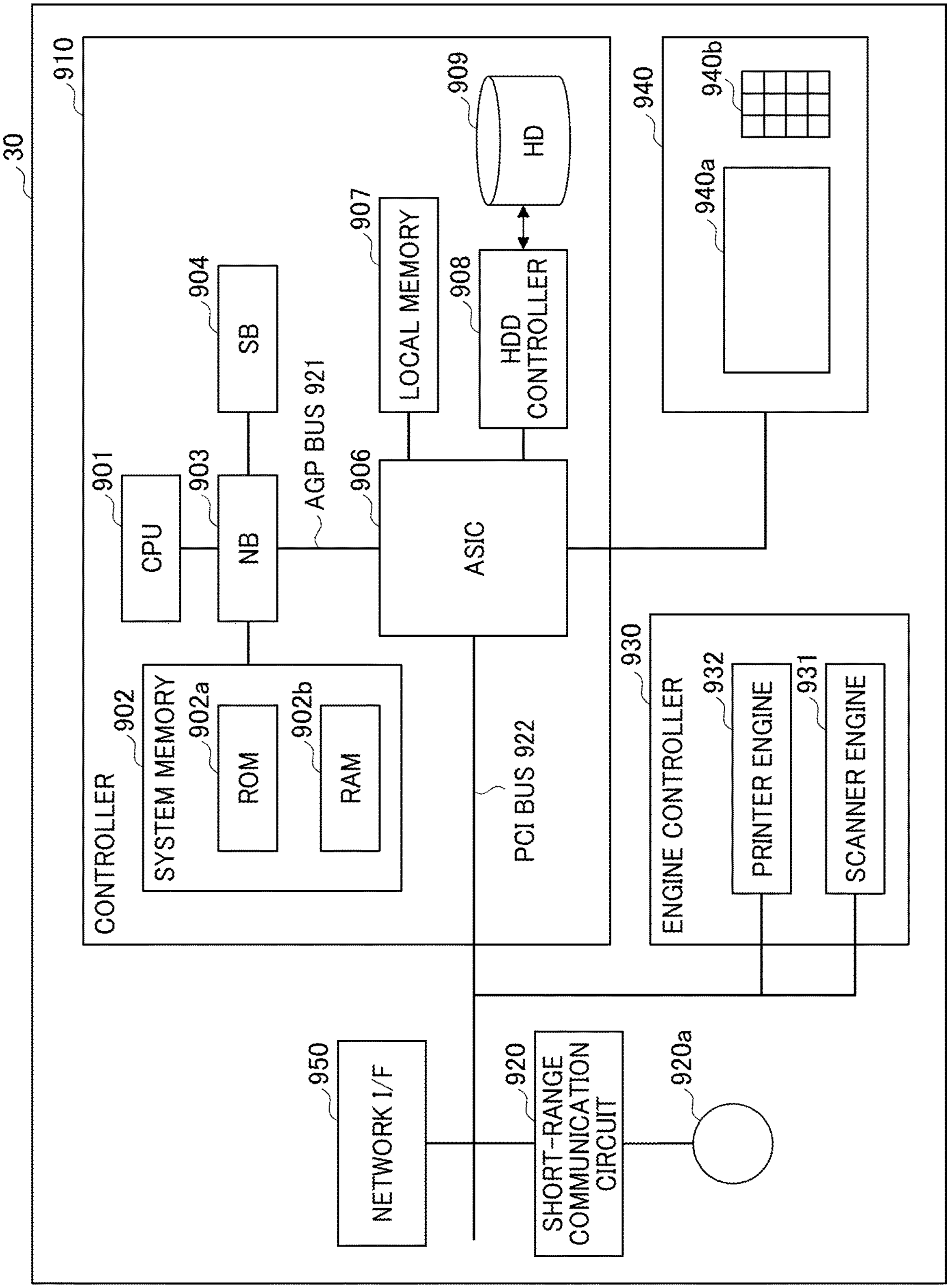
FIG. 3 is a block diagram illustrating a hardware configuration of a multifunction peripheral (MFP) according to one embodiment of the present disclosure.

A description is given of a hardware configuration of each apparatus included in the information processing system 1 according to the present embodiment with reference to FIGS. 2 and 3.

Hardware Configuration of Computer

FIG. 2 is a block diagram illustrating an example of a hardware configuration of the information processing system 1 in a case where each of the document management server 10, the document processing server 20, and the user terminals 30 is implemented as a computer.

As illustrated in FIG. 2, the computer includes a central processing unit (CPU) 501, a read only memory (ROM) 502, a random access memory (RAM) 503, a hard disk (HD) 504, a hard disk drive (HDD) controller 505, a display 506, an external device interface (I/F) 508, a network I/F 509, a data bus 510, a keyboard 511, a pointing device 512, a digital versatile disc rewritable (DVD-RW) drive 514, and a medium I/F 516.

The CPU 501 controls entire operation of the computer. The ROM 502 stores a program such as an initial program loader (IPL) used for driving the CPU 501. The RAM 503 is used as a work area for the CPU 501. The HD 504 stores various data such as a program. The HDD controller 505 controls reading and writing of various data from and to the HD 504 under control of the CPU 501.

The display 506 displays various information such as a cursor, a menu, a window, characters, and images. The external device I/F 508 is an interface for connection with various external devices. Examples of the external devices include, but not limited to, a universal serial bus (USB) memory and a printer. The network I/F 509 is an interface for data communication through the communication network N1. The data bus 510 is an address bus or a data bus, which electrically connects each component illustrated in FIG. 2 such as the CPU 501.

The keyboard 511 is an example of an input device including a plurality of keys for inputting characters, numerical values, various instructions, and the like. The pointing device 512 is an example of an input device that allows a user to select or execute various instructions, select an object for processing, and move a cursor being displayed. The DVD-RW drive 514 controls reading and writing of various data from and to a DVD-RW 513, which is an example of a removable storage medium. The removable storage medium is not limited to the DVD-RW and may be a digital versatile disc-recordable (DVD-R) or the like. The medium OF 516 controls reading and writing (storing) of data from and to a recording medium 515 such as a flash memory.

Hardware Configuration of MFP

FIG. 3 is a block diagram illustrating an example of a hardware configuration of the information processing system 1 in a case where each of the user terminals 30 is implemented as an MFP. As illustrated in FIG. 3, the MFP includes a controller 910, a short-range communication circuit 920, an engine controller 930, a control panel 940, and a network I/F 950.

The controller 910 includes a CPU 901 as a main processor, a system memory 902, a north bridge (NB) 903, a south bridge (SB) 904, an application specific integrated circuit (ASIC) 906, a local memory 907 as a storage area, an HDD controller 908, and an HD 909 as a storage area. The NB 903 and the ASIC 906 are connected via an accelerated graphics port (AGP) bus 921.

The CPU 901 is a processor that controls entire operation of the MFP. The NB 903 is a bridge for connecting the CPU 901 with the system memory 902, the SB 904, and the AGP bus 921. The NB 903 includes a memory controller for controlling reading and writing of various data from and to the system memory 902, a peripheral component interconnect (PCI) master, and an AGP target.

The system memory 902 includes a ROM 902*a* as a memory that stores a program and data for implementing various functions of the controller 910. The system memory 902 further includes a RAM 902*b* used as a memory to load the program and the data, or as a memory for loading drawing data for printing. The program stored in the ROM 902*a* may be stored in any computer-readable recording medium, such as a compact disc read only memory (CD-ROM), a compact disc recordable (CD-R), or a digital versatile disc (DVD), in a file format installable or executable by a computer, for distribution.

The SB 904 is a bridge for connecting the NB 903 to a PCI device and a peripheral device. The ASIC 906 is an integrated circuit (IC) for image processing applications including hardware elements for image processing and has a role of a bridge connecting the AGP bus 921, a PCI bus 922, the HDD controller 908, and the local memory 907 each other. The ASIC 906 includes a PCI target, an AGP master, an arbiter (ARB) as a central processor of the ASIC 906, a memory controller to control the local memory 907, a plurality of direct memory access controllers (DMACs), and a PCI unit. The DMACs rotate image data by converting coordinates of the image data with, for example, a hardware logic. The PCI unit transfers data between a scanner engine 931 and a printer engine 932 via the PCI bus 922. The ASIC 906 may be connected to a USB interface, the Institute of Electrical and Electronics Engineers 1394 (IEEE1394) interface, or both.

The local memory 907 is a local memory used as a copy image buffer and a code buffer. The HD 909 is a storage for storing image data, font data used during printing, and forms. The HDD controller 908 controls reading and writing of various data from and to the HD 909 under control of the CPU 901. The AGP bus 921 is a bus interface for a graphics accelerator card, which has been proposed to accelerate graphics processing. Through directly accessing the system memory 902 by high-throughput, speed of the graphics accelerator card is improved.

The short-range communication circuit 920 includes a short-range communication antenna 920*a*. The short-range communication circuit 920 is a communication circuit in compliance with the near field communication (NFC), BLUETOOTH, or the like.

The engine controller 930 includes the scanner engine 931 and the printer engine 932. The control panel 940 includes a panel display 940*a* and an operation panel 940*b*. The panel display 940*a* is, for example, a touch panel that displays current settings or a selection screen and receives a user input. The operation panel 940*b* includes, for example, a numeric keypad and a start key. The numeric keypad receives assigned values of image forming parameters such as an image density parameter. The start key receives an instruction to start copying, for example. The controller 910 controls entire operation of the MFP. For example, the controller 910 controls rendering, communication, or user inputs from the control panel 940. The scanner engine 931 or the printer engine 932 includes an image processing unit for error diffusion, gamma conversion, and the like.

The MFP may sequentially switch to select a document server function, a copying function, a printing function, and a facsimile communication function by an application switching key of the control panel 940. When the document server function is selected, a document server mode is set, when the copying function is selected, a copy mode is set, when the printing function is selected, a printer mode is set, and when the facsimile communication function is selected, a facsimile mode is set.

The network I/F 950 is an interface for data communication through the communication network N1. The short-range communication circuit 920 and the network I/F 950 are electrically connected to the ASIC 906 via the PCI bus 922.

Functional Configuration of Information Processing System

Figure 4:
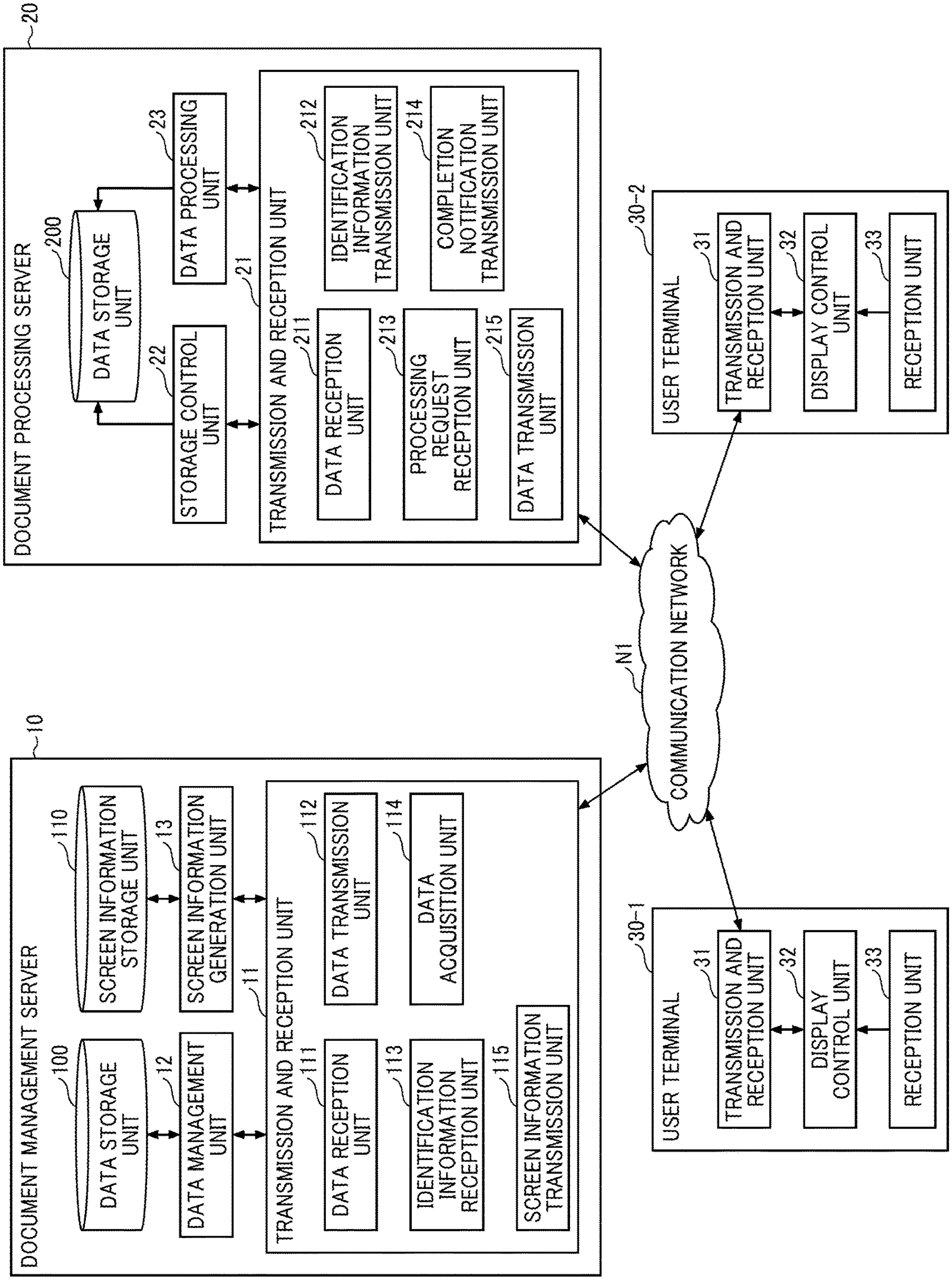
FIG. 4 is a block diagram illustrating a functional configuration of the information processing system according to one embodiment of the present disclosure.

A description is given of a functional configuration of the information processing system according to the present embodiment with reference to FIG. 4. FIG. 4 is a block diagram illustrating an example of the functional configuration of the information processing system 1 according to the present embodiment.

Functional Configuration of Document Management Server

As illustrated in FIG. 4, the document management server 10 according to the present embodiment includes a transmission and reception unit 11, a data management unit 12, a screen information generation unit 13, a data storage unit 100, and a screen information storage unit 110. The transmission and reception unit 11 according to the present embodiment includes a data reception unit 111, a data transmission unit 112, an identification information reception unit 113, a data acquisition unit 114, and a screen information transmission unit 115.

The transmission and reception unit 11 is implemented by, for example, processing executed by the CPU 501 and the network I/F 509 according to a program loaded from the HD 504 onto the RAM 503. These elements are illustrated in FIG. 2.

The data management unit 12 and the screen information generation unit 13 are implemented by, for example, processing executed by the CPU 501 and the HDD controller 505 according to a program loaded from the HD 504 onto the RAM 503. These elements are illustrated in FIG. 2.

The data storage unit 100 and the screen information storage unit 110 are implemented by using, for example, the HD 504 illustrated in FIG. 2. Reading and writing of data from and to the HD 504 is performed, for example, via the HDD controller 505.

The transmission and reception unit 11 transmits and receives various types of information to and from other servers or devices via the communication network N1.

The data reception unit 111 receives a document and metadata from the user terminal 30-1. In addition, the data reception unit 111 requests the data management unit 12 to store the document and the metadata received from the user terminal 30-1.

The data transmission unit 112 transmits a request to process the document stored in the data storage unit 100 to the document processing server 20. The request to process the document includes a document to be processed (hereinafter, also referred to as the "unprocessed document").

The identification information reception unit 113 receives, from the document processing server 20, identification information assigned to the unprocessed document by the document processing server 20. Hereinafter, the identification information assigned to the unprocessed document is also referred to as an "external document ID." The identification information reception unit 113 requests the data management unit 12 to store the external document ID received from the document processing server 20.

The data acquisition unit 114 receives a completion notification to be transmitted when the document processing server 20 completes processing on the document. The completion notification includes the external document ID of the document on which the processing has been completed. Further, the data acquisition unit 114 transmits, to the document processing server 20, a request to acquire a document obtained as a result of the processing executed by the document processing server 20 on the unprocessed document. Hereinafter, the document obtained as a result of the processing executed by the document processing server 20 on the unprocessed document is also referred to as the "processed document." The request to acquire the document includes the external document ID included in the completion notification.

In response to a request from the user terminal 30-1, the screen information transmission unit 115 transmits screen information generated by the screen information generation unit 13 to the user terminal 30-1. The screen information generated by the screen information generation unit 13 is information representing a screen for operating the document management server 10.

The data management unit 12 manages the document and the metadata stored in the data storage unit 100. Specifically, the data management unit 12 stores the document and the metadata received from the user terminal 30-1 or the document processing server 20 in the data storage unit 100. At this time, the data management unit 12 issues identification information for identifying the document (hereinafter, also referred to as a "document ID") and stores the identification information in the metadata of the document to store the document and the document ID in association with each other.

In response to a request from the user terminal 30-1, the screen information generation unit 13 generates the screen information to be transmitted to the user terminal 30-1. The screen information generation unit 13 generates the screen information based on the screen information stored in the screen information storage unit 110, and the document and the metadata stored in the data storage unit 100.

The data storage unit 100 stores the document managed by the document management server 10 and the metadata in association with each other. The document stored in the data storage unit 100 is a body of an electronic file representing the contents of the document. The document is stored in the data storage unit 100 in a file format corresponding to a file system of the data storage unit 100. The metadata is stored in a metadata table.

In addition, the data storage unit 100 stores workflow information that defines workflow to be executed by the document management server 10. The workflow information may be described in an electronic file in text format or may be stored in a table in a database.

The screen information storage unit 110 stores the screen information transmitted by the screen information transmission unit 115 to the user terminal 30-1. Each piece of the screen information stored in the screen information storage unit 110 is described in, for example, hypertext markup language (HTML), and may include an application described in JAVASCRIPT or the like.

Functional Configuration of Document Processing Server

As illustrated in FIG. 4, the document processing server 20 according to the present embodiment includes a transmission and reception unit 21, a storage control unit 22, a data processing unit 23, and a data storage unit 200. The transmission and reception unit 21 according to the present embodiment includes a data reception unit 211, an identification information transmission unit 212, a processing request reception unit 213, a completion notification transmission unit 214, and a data transmission unit 215.

The transmission and reception unit 21 is implemented by, for example, processing executed by the CPU 501 and the network OF 509 according to a program loaded from the HD 504 onto the RAM 503. These elements are illustrated in FIG. 2.

The storage control unit 22 and the data processing unit 23 are implemented by, for example, processing executed by the CPU 501 and the HDD controller 505 according to a program loaded from the HD 504 onto the RAM 503. These elements are illustrated in FIG. 2.

The data storage unit 200 is implemented by using, for example, the HD 504 illustrated in FIG. 2. Reading and writing of data from and to the HD 504 is performed, for example, via the HDD controller 505.

The transmission and reception unit 21 transmits and receives various types of information to and from other servers or devices via the communication network N1.

The data reception unit 211 receives a document from the document management server 10. In addition, the data reception unit 211 requests the storage control unit 22 to store the document received from the document management server 10.

The identification information transmission unit 212 transmits, to the document management server 10, the external document ID issued when the storage control unit 22 stores the document. The identification information transmission unit 212 can transmit the external document ID to the document management server 10 via an Application Programming Interface (API) provided by the document management server 10, for example.

The processing request reception unit 213 receives a request to process the document stored in the data storage unit 200 from the user terminal 30-2. The request to process the document includes the external document ID of the document to be processed. Further, the processing request reception unit 213 requests the data processing unit 23 to process the document identified with the external document ID.

The completion notification transmission unit 214 transmits a completion notification to the document management server 10 in response to receiving a notification of completion of processing from the data processing unit 23. The completion notification includes the external document ID of the document on which the processing has been completed. The completion notification transmission unit 214 can transmit the external document ID to the document management server 10 via an API provided by the document management server 10, for example.

The data transmission unit 215 receives a request to acquire the document on which the processing has been completed from the document management server 10. The request to acquire the document on which the processing has been completed includes the external document ID of the processed document. Further, the data transmission unit 215 transmits the processed document identified by the external document ID to the document management server 10.

The storage control unit 22 performs control for storing a document in the data storage unit 200. At this time, the storage control unit 22 issues an external document ID for identifying the document, and stores the document and the external document ID in the data storage unit 200 in association with each other.

In response to a request from the user terminal 30-2, the data processing unit 23 executes predetermined processing on the document stored in the data storage unit 200. For example, assuming that the document processing server 20 is an electronic contract system, the predetermined processing is processing of electronically adding a signature or a seal to a document representing a contract.

The data storage unit 200 stores a document managed by the document processing server 20. The document stored in the data storage unit 200 is a body of an electronic file representing the contents of the document. The document is stored in the data storage unit 200 in a file format corresponding to a file system of the data storage unit 200.

Functional Configuration of User Terminals

As illustrated in FIG. 4, each of the user terminals 30 according to the present embodiment includes a transmission and reception unit 31, a display control unit 32, and a reception unit 33.

The transmission and reception unit 31 is implemented by, for example, processing executed by the CPU 501 and the network I/F 509 according to a program loaded from the HD 504 onto the RAM 503. These elements are illustrated in FIG. 2.

The display control unit 32 is implemented by, for example, processing executed by the CPU 501 and the display 506 according to a program loaded from the HD 504 onto the RAM 503. These elements are illustrated in FIG. 2.

The reception unit 33 is implemented by, for example, processing executed by the CPU 501 and the keyboard 511 or the pointing device 512 according to a program loaded from the HD 504 onto the RAM 503. These elements are illustrated in FIG. 2.

The transmission and reception unit 31 transmits and receives various types of information to and from other servers or devices via the communication network N1.

The display control unit 32 displays a screen for operating each of the other servers based on screen information received by the transmission and reception unit 31 from the other servers.

The reception unit 33 receives various operations performed by a user. The operations performed by the user includes an operation to input a file in which electronic data is recorded.

Information Processing Method

Figure 5:
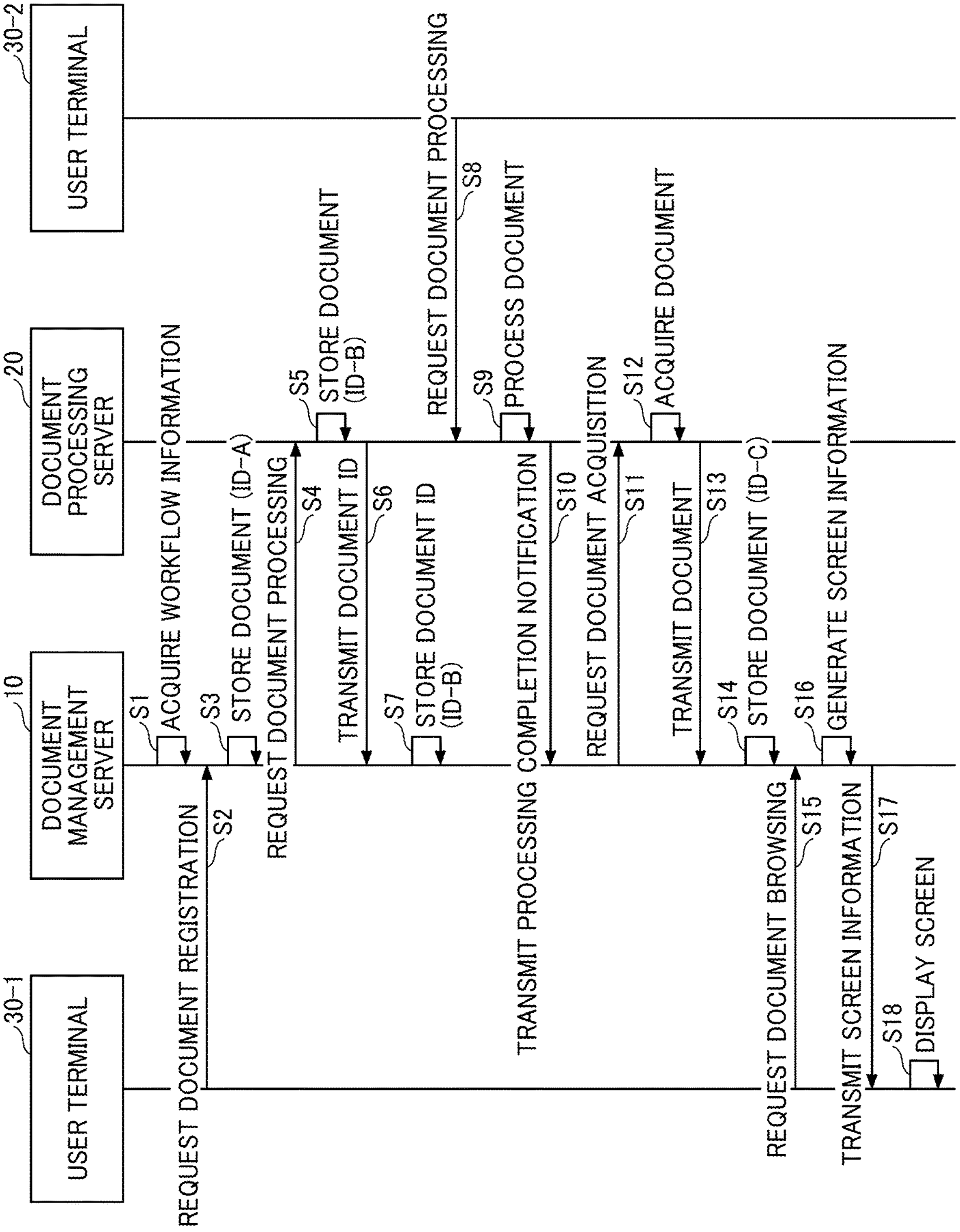
FIG. 5 is a sequence chart illustrating an information processing method according to one embodiment of the present disclosure.

A description is given of an example of an information processing method executed by the information processing system 1 according to the present embodiment with reference to FIG. 5. FIG. 5 is a sequence chart illustrating the information processing method according to the present embodiment.

In step S1, the document management server 10 acquires workflow information stored in the data storage unit 100.

Figures 6, 7:
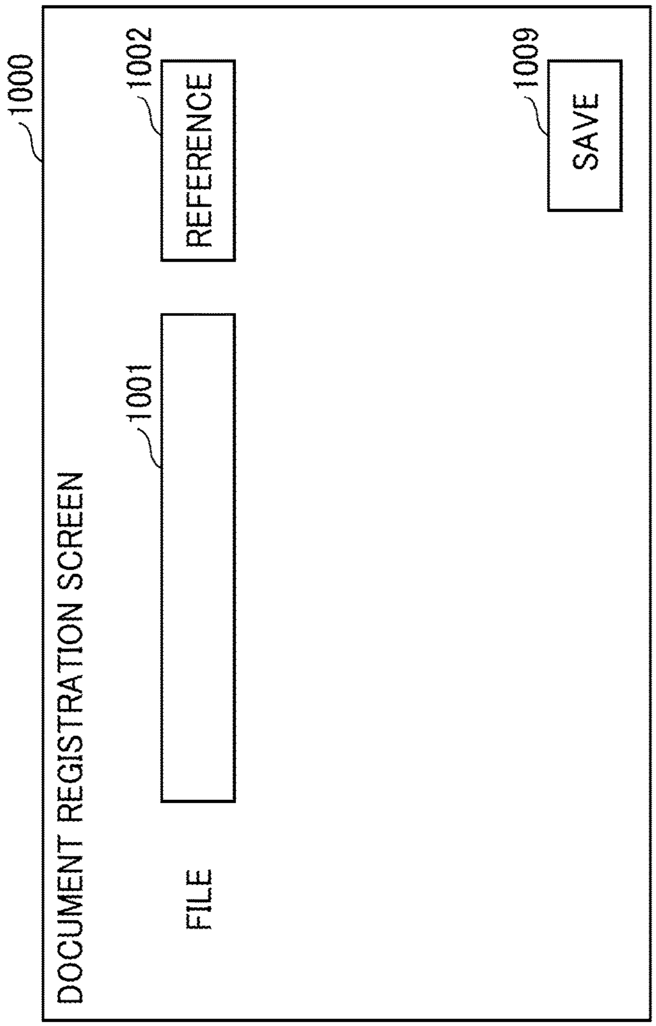
FIG. 6 is a table illustrating an example of workflow information according to one embodiment of the present disclosure.
FIG. 7 is a diagram illustrating an example of a document registration screen according to one embodiment of the present disclosure.

Here, a description is given of the workflow information according to the present embodiment with reference to FIG. 6. FIG. 6 is a table illustrating an example of the workflow information according to the present embodiment.

As illustrated in FIG. 6, the workflow information according to the present embodiment includes, as data items, a starting trigger and one or more flows. The starting trigger is information defining an event that triggers execution of the workflow. The one or more flows are information defining one or more processes to be executed and the order thereof in the workflow. In a case where workflow information includes a plurality of flows, the plurality of flows is executed in order according to assigned numbers.

The first workflow information (assigned with NO. 1) illustrated in FIG. 6 indicates that the first workflow starts with an event in which a document is saved as a starting trigger, and an examination process by a user A and an approval process by a user B are executed in order. The second workflow information (assigned with NO. 2) illustrated in FIG. 6 indicates that the second workflow starts with an event in which a document is saved as a starting trigger, and a process of sending the document to a document processing server and a process of acquiring the processed document in response to a completion notification sent from the document processing server are executed in order.

Returning to FIG. 5, the description continues. In step S2, the display control unit 32 included in the user terminal 30-1 displays on, for example, the display 506 a document registration screen in response to an operation by the requester. The display control unit 32 may authenticate the requester prior to displaying the document registration screen, and display the document registration screen in a case where the authentication is successful. In the following description, it is assumed that the requester is successfully authenticated.

Here, a description is given of the document registration screen according to the present embodiment with reference to FIG. 7. FIG. 7 is a diagram illustrating an example of the document registration screen according to the present embodiment.

As illustrated in FIG. 7, a document registration screen 1000 according to the present embodiment includes a file input field 1001, a reference button 1002, and a save button 1009.

The file input field 1001 receives an input of information indicating a location of an electronic file corresponding to a document to be registered. The information indicating the location of the electronic file may be an absolute path, a relative path, or information described in a uniform resource identifier (URI) format indicating a file on another apparatus.

When the user presses the reference button 1002, a dialog for selecting a file starts. The user performs an input to the file input field 1001 by selecting a file using the dialog for selecting a file.

The document to be registered is a document to be processed by the document processing server 20. For example, assuming that the document processing server 20 is an electronic contract system, the document is electronic data representing an unconcluded contract.

When the user presses the save button 1009, the reception unit 33 receives an input of a document specified by the content entered in the file input field 1001. Then, the display control unit 32 displays a metadata setting screen.

Figure 8:
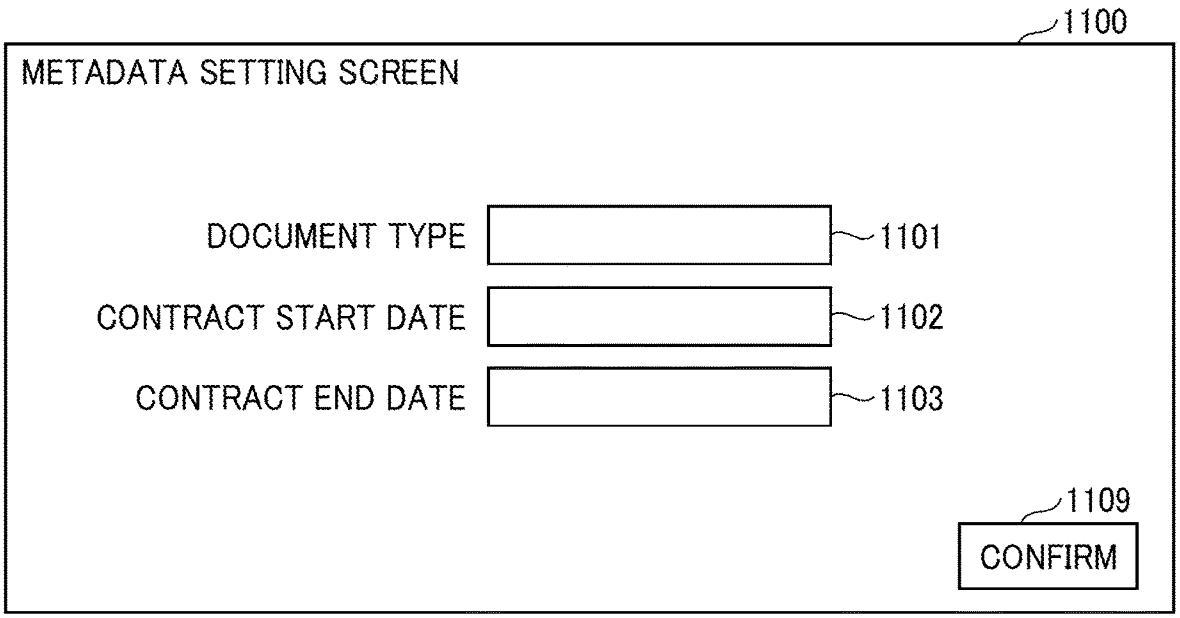
FIG. 8 is a diagram illustrating an example of a metadata setting screen according to one embodiment of the present disclosure.

Here, a description is given of the metadata setting screen according to the present embodiment with reference to FIG. 8. FIG. 8 is a diagram illustrating an example of the metadata setting screen according to the present embodiment.

As illustrated in FIG. 8, the metadata setting screen 1100 according to the present embodiment includes a document type input field 1101, a contract start date input field 1102, a contract end date input field 1103, and a confirm button 1109.

The document type input field 1101 receives an input of attribute information indicating a document type. The contract start date input field 1102 receives an input of attribute information indicating a contract start date. The contract end date input field 1103 receives an input of attribute information indicating a contract end date.

The user can add an input field in the metadata setting screen 1100, and change and delete each input field included in the metadata setting screen 1100 as desired in accordance with the contents that the user desires to set in the metadata. An input field corresponding to an item not set in the metadata may be left blank.

When the user presses the confirm button 1109, the reception unit 33 receives an input of the metadata representing the contents input to the document type input field 1101, the contract start date input field 1102, and the contract end date input field 1103.

Subsequently, the reception unit 33 requests the transmission and reception unit 31 to transmit a request to register the document and the metadata received by the reception unit 33. The transmission and reception unit 31 transmits the document and the metadata received by the reception unit 33 to the document management server 10.

Here, a description is given of metadata according to the present embodiment with reference to FIG. 9. FIG. 9 is a table illustrating an example of the metadata according to the present embodiment.

As illustrated in FIG. 9, the metadata according to the present embodiment includes, as data items, a document ID, a document type, a contract start date, a contract end date, an external document ID, a processed document ID, and the like.

The document ID is identification information for identifying a document. The external document ID is identification information assigned to the document by the document processing server 20. The processed document ID is identification information for identifying a processed document obtained as a result of the predetermined processing executed by the document processing server 20 on an unprocessed document.

The contents input in the metadata setting screen are set as the values of the data items of the document type, the contract start date, and the contract end date. The metadata illustrated in FIG. 9 is an example in a case where the document is electronic data representing a contract. FIG. 9 is merely an example, and the user can add a data item to be included in the metadata, and change and delete each data item included in the metadata as desired. Further, there may be a data item not set in the metadata depending on the document type or a state of processing.

Returning to FIG. 5, the description continues. In step S3, the data reception unit 111 included in the document management server 10 receives the document and the metadata from the user terminal 30-1. Then, the data reception unit 111 requests the data management unit 12 to store the document and the metadata received from the user terminal 30-1.

The data management unit 12 issues a document ID for identifying the document received from the user terminal 30-1. Hereinafter, the document received from the user terminal 30-1 is also referred to as the “unprocessed document” and the document ID for identifying the document received from the user terminal 30-1 referred to as an “unprocessed document ID.” Here, it is assumed that “ID- A" is issued as the unprocessed document ID. Then, the data management unit 12 stores the unprocessed document ID issued by the data management unit 12 in the metadata received from the user terminal 30-1. Subsequently, the data management unit 12 stores the unprocessed document and the metadata in the data storage unit 100.

Subsequent processing is executed based on the workflow information defining the workflow that starts with an event in which a document is saved as a starting trigger.

In step S4, the data transmission unit 112 included in the document management server 10 transmits a request to process the unprocessed document to the document processing server 20. The request to process the unprocessed document includes the unprocessed document.

In step S5, the data reception unit 211 included in the document processing server 20 receives the request to process the unprocessed document from the document management server 10. Then, the data reception unit 211 requests the storage control unit 22 to store the unprocessed document received from the document management server 10.

The storage control unit 22 issues an external document ID for identifying the unprocessed document. Here, it is assumed that "ID-B" is issued as the external document ID. Then, the storage control unit 22 stores the unprocessed document and the external document ID in the data storage unit 200 in association with each other.

In step S6, the identification information transmission unit 212 included in the document processing server 20 transmits the external document ID stored in the data storage unit 200 to the document management server 10.

In step S7, the identification information reception unit 113 included in the document management server 10 receives the external document ID from the document processing server 20. Then, the identification information reception unit 113 requests the data management unit 12 to store the external document ID received from the document processing server 20.

The data management unit 12 stores the external document ID in the metadata associated with the unprocessed document. Thus, the unprocessed document ID and the external document ID are stored in the data storage unit 100 in association with each other.

In step S8, the display control unit 32 included in the user terminal 30-2 displays a document processing screen in response to an operation by the processing executor. The display control unit 32 may authenticate the processing executor prior to displaying the document processing screen, and display the document processing screen in a case where the authentication is successful. In the following description, it is assumed that the processing executor is successfully authenticated.

Figure 10:
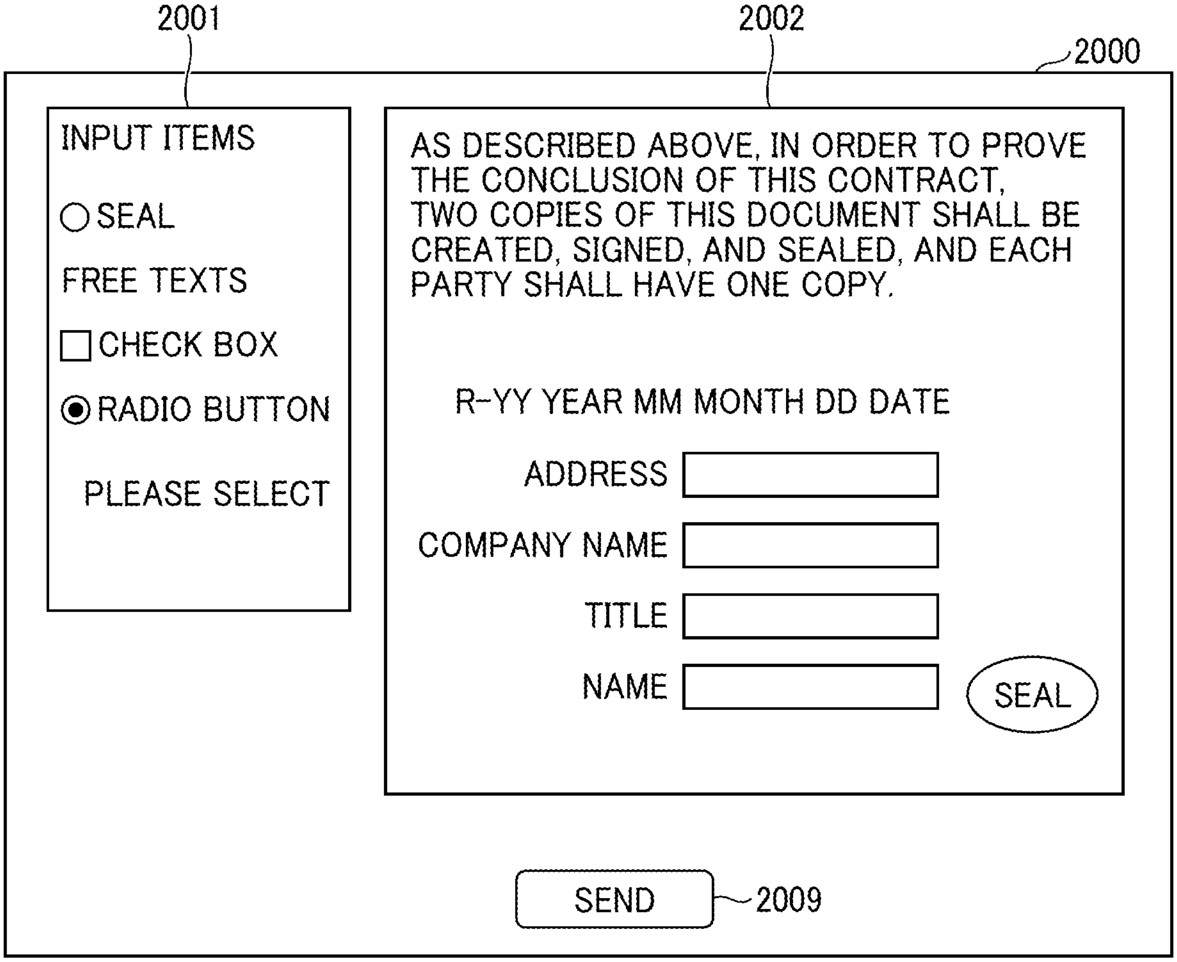
FIG. 10 is a diagram illustrating an example of a document processing screen according to one embodiment of the present disclosure.

Here, a description is given of the document processing screen according to the present embodiment with reference to FIG. 10. FIG. 10 is a diagram illustrating an example of the document processing screen according to the present embodiment.

FIG. 10 is an example of the document processing screen in a case where the document processing server 20 is an electronic contract system. The document processing screen varies depending on the contents of processing to be executed by the document processing server 20.

As illustrated in FIG. 10, a document processing screen 2000 according to the present embodiment includes an input item selection field 2001, a preview field 2002, and a send button 2009.

In the input item selection field 2001, input items settable in a contract are displayed. In the preview field 2002, a preview of the contents of the contract to be processed is displayed.

When the user selects an input item to be set out of the input items in the input item selection field 2001 and then presses a position where the selected input item is to be placed in the preview field 2002, the contents of the contract in which the selected input item is placed at the position is displayed in the preview field 2002.

When the user presses the send button 2009, the reception unit 33 receives setting information representing the type and the position of each input item set in the preview field 2002. Then, the reception unit 33 requests the transmission and reception unit 31 to transmit a request to process the document. The request to process the document includes the external document ID and the setting information. The transmission and reception unit 31 transmits the request to process the document to the document processing server 20.

Returning to FIG. 5, the description continues. In step S9, the processing request reception unit 213 included in the document processing server 20 receives the request to process the document from the user terminal 30-2. Then, the processing request reception unit 213 transmits, to the data processing unit 23, the request to process the document received from the user terminal 30-2.

The data processing unit 23 executes predetermined processing on the document stored in the data storage unit 200 in accordance with the request to process the document. When the predetermined processing is completed, the data processing unit 23 transmits a notification indicating completion of the predetermined processing to the completion notification transmission unit 214. The notification includes the external document ID of the document for which the predetermined processing has been completed.

In step S10, the completion notification transmission unit 214 included in the document processing server 20 transmits a completion notification to the document management server 10 in response to receiving the notification indicating completion of the predetermined processing from the data processing unit 23. The completion notification includes the external document ID notified from the data processing unit 23.

The processing of step S10 is executed by using a webhook technique. Specifically, when, for example, a system administrator registers in advance, in the document processing server 20, a notification destination representing the document management server 10 to which a notification is to be sent by the data processing unit 23 in response to completion of processing, the completion notification transmission unit 214 transmits the completion notification to the document management server 10.

In step S11, the data acquisition unit 114 included in the document management server 10 receives the completion notification from the document processing server 20. Then, the data acquisition unit 114 transmits a request to acquire a processed document to the document processing server 20. The request to acquire the processed document includes the external document ID included in the completion notification.

In step S12, the data transmission unit 215 included in the document processing server 20 receives, from the document management server 10, the request to acquire the processed document. Then, the data transmission unit 215 transmits a request for the processed document to the storage control unit 22. The request for the processed document includes the external document ID included in the request to acquire the processed document.

The storage control unit 22 acquires, from the data storage unit 200, a document identified by the external document ID included in the request for the processed document received from the data transmission unit 215. Then, the storage control unit 22 transmits the processed document acquired from the data storage unit 200 to the data transmission unit 215.

In step S13, the data transmission unit 215 included in the document processing server 20 receives the processed document from the storage control unit 22. Then, the data transmission unit 215 transmits the processed document received from the storage control unit 22 to the document management server 10.

In step S14, the data acquisition unit 114 included in the document management server 10 receives the processed document from the document processing server 20. Then, the data acquisition unit 114 requests the data management unit 12 to store the processed document received from the document processing server 20.

The data management unit 12 issues a document ID for identifying the processed document (hereinafter, also referred to as the "processed document ID"). Here, it is assumed that "ID-C" is issued as the processed document ID. Then, the data management unit 12 stores the processed document ID in the metadata of the processed document. Subsequently, the data management unit 12 stores the processed document and the metadata in the data storage unit 100.

The data management unit 12 identifies a document based on the external document ID included in the completion notification. Then, the data management unit 12 stores the processed document ID in the metadata associated with the document specified based on the external document ID. Thus, the unprocessed document ID and the processed document ID are stored in the data storage unit 100 in association with each other.

Here, a description is given of setting contents of metadata according to the present embodiment with reference to FIGS. 11A, 11B, and 11C. FIGS. 11A, 11B, and 11C are tables illustrating examples of the setting contents of the metadata according to the present embodiment.

FIG. 11A is a table illustrating an example of the setting contents of the metadata at the time when the unprocessed document is stored in step S3. As illustrated in FIG. 11A, at this time, only the unprocessed document ID (ID-A) is set, and the external document ID and the processed document ID are not set.

FIG. 11B is a table illustrating an example of the setting contents of the metadata at the time when the external document ID is received in step S7. As illustrated in FIG. 11B, at this time, the unprocessed document ID (ID-A) and the external document ID (ID-B) are set, and the processed document ID is not set.

FIG. 11C is a table illustrating an example of the setting contents of the metadata at the time when the processed document is stored in step S14. As illustrated in FIG. 11C, at this time, the unprocessed document ID (ID-A), the external document ID (ID-B), and the processed document ID (ID-C) are all set. As described above, it can be seen that the unprocessed document ID and the processed document ID are associated with each other by the metadata.

Returning to FIG. 5, the description continues. In step S15, the reception unit 33 included in the user terminal 30-1 receives an operation to view a document performed by the requester. The operation to view a document is, for example, an operation of opening a link included in a notification transmitted from the workflow.

The reception unit 33 requests the transmission and reception unit 31 to transmit a request to acquire a document browsing screen. The transmission and reception unit 31 transmits the request to acquire the document browsing screen to the document management server 10. The request to acquire the document browsing screen includes a document ID of a document to be viewed.

In step S16, the transmission and reception unit 11 included in the document management server 10 receives the request to acquire the document browsing screen from the user terminal 30-1. Then, the transmission and reception unit 11 transmits the request to acquire the document browsing screen to the screen information generation unit 13.

The screen information generation unit 13 receives the request to acquire the document browsing screen from the transmission and reception unit 11. Then, the screen information generation unit 13 acquires screen information of the document browsing screen from the screen information storage unit 110. Further, the screen information generation unit 13 requests, from the data managing unit 12, information of a document relating to the document ID included in the request to acquire the document browsing screen.

The data management unit 12 specifies metadata associated with the document identified by the document ID included in the request to acquire the document browsing screen. Then, the data management unit 12 acquires a processed document ID from the metadata specified by the data management unit 12. Further, in a case where there is another metadata in which the processed document ID acquired from the metadata is stored as an unprocessed document ID, the data management unit 12 repeatedly acquires the processed document ID corresponding to the unprocessed document ID from the other metadata. The data management unit 12 transmits at least one processed document ID acquired from the metadata to the screen information generation unit 13.

The screen information generation unit 13 embeds the processed document ID received from the data management unit 12 into the screen information acquired from the screen information storage unit 110. Thus, screen information of the document browsing screen to be transmitted to the user terminal 30-1 is generated.

In step S17, the screen information generation unit 13 included in the document management server 10 requests the screen information transmission unit 115 to transmit the screen information of the document browsing screen. The screen information transmission unit 115 transmits the screen information of the document browsing screen to the user terminal 30-1.

In step S18, the transmission and reception unit 31 included in the user terminal 30-1 receives the screen information of the document browsing screen from the document management server 10. Then, the transmission and reception unit 31 transmits the screen information received from the document management server 10 to the display control unit 32. The display control unit 32 causes the display 506 to display the document browsing screen based on the screen information received from the transmission and reception unit 31.

Figure 12:
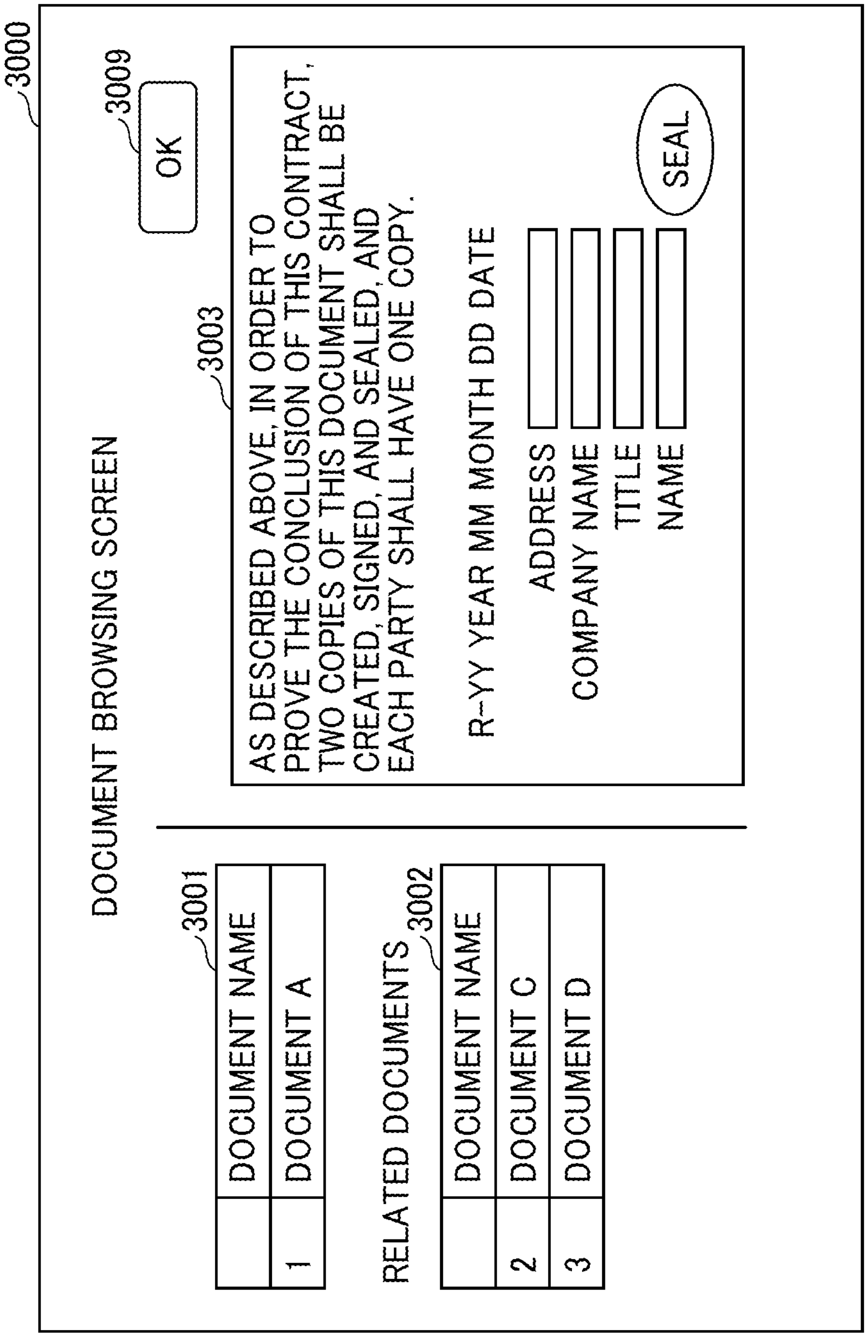
FIG. 12 is a diagram illustrating an example of a document browsing screen according to one embodiment of the present disclosure.
Figure 13:
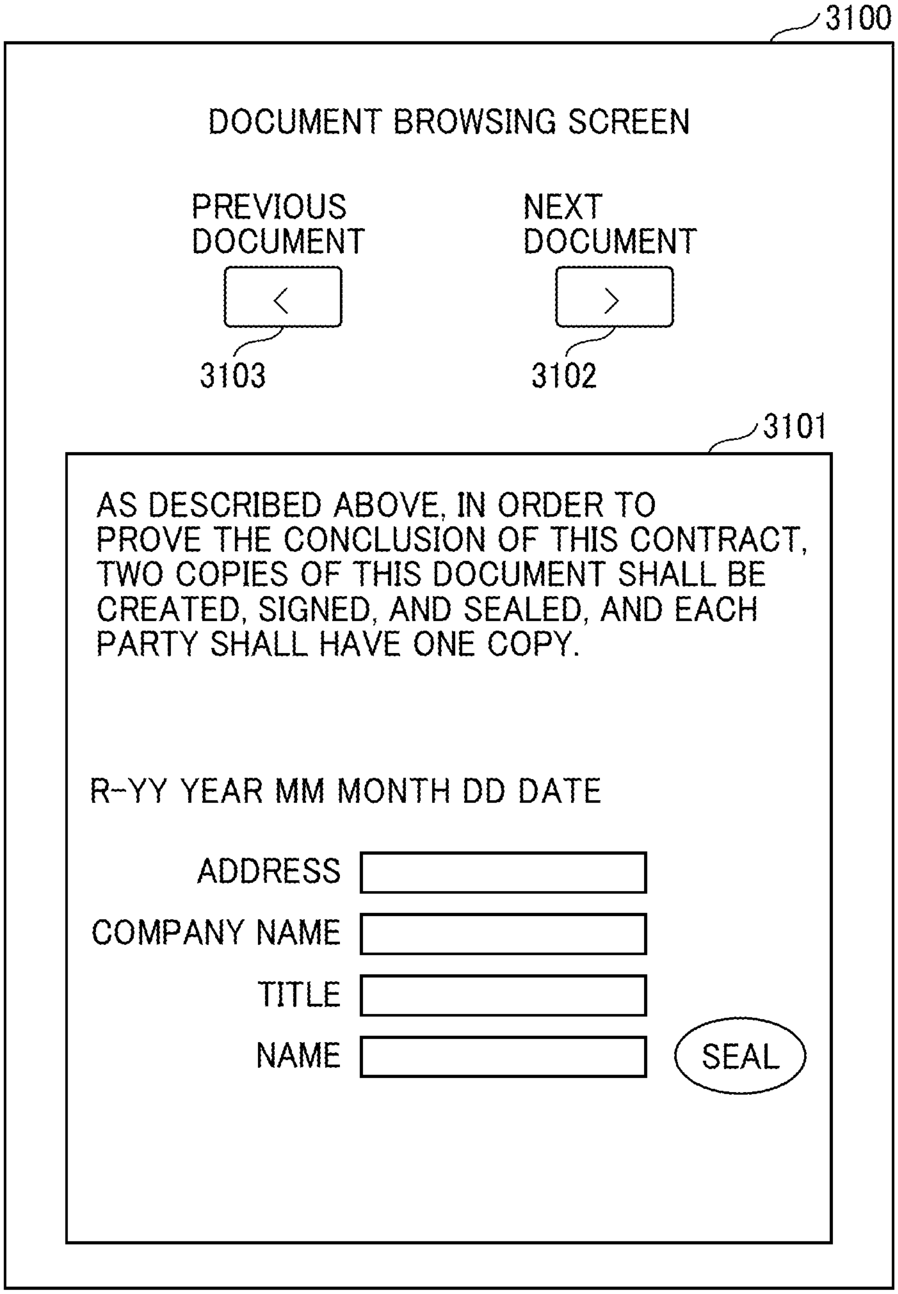
FIG. 13 is a diagram illustrating another example of the document browsing screen according to one embodiment of the present disclosure.

Here, a description is given of the document browsing screen according to the present embodiment with reference to FIGS. 12 and 13.

FIG. 12 is a diagram illustrating an example of the document browsing screen according to the present embodiment. As illustrated in FIG. 12, a document browsing screen 3000 according to the present embodiment includes a document display field 3001, a related document display field 3002, a preview field 3003, and an "OK" button 3009.

In the document display field 3001, information on a document (e.g., a document name) specified by a user operation to be viewed is displayed. In the related document display field 3002, information on a document relating to the document to be viewed is displayed.

The document relating to the document to be viewed is a document obtained as a result of predetermined processing executed on the document to be viewed. In a case where a plurality of processed documents is associated with each other due to execution of the predetermined processing a plurality of times, information on all the documents relating to the document to be viewed is displayed in the related document display field 3002.

When an operation to specify a document is performed in the document display field 3001 or the related document display field 3002, a preview of the contents of the specified document is displayed in the preview field 3003. Thus, the user can compare the contents of the unprocessed document and the contents of the processed document on the document browsing screen 3000 with a simple operation.

FIG. 13 is a diagram illustrating another example of the document browsing screen according to the present embodiment. As illustrated in FIG. 13, a document browsing screen 3100 according to the present embodiment includes a preview field 3101, a "NEXT DOCUMENT" button 3102, and a "PREVIOUS DOCUMENT" button 3103.

In the preview field 3101, a preview of the contents of a document is displayed. In the initial state, the document to be viewed is displayed. When the "NEXT DOCUMENT" button 3102 is pressed, a processed document corresponding to the document displayed in the preview field 3101 is displayed in the preview field 3101. When the "PREVIOUS DOCUMENT" button 3103 is pressed, an unprocessed document corresponding to the document displayed in the preview field 3101 is displayed in the preview field 3101.

In the information processing system according to the present embodiment, the document management server transmits an unprocessed document to the document processing server, and acquires an external document ID assigned to the unprocessed document by the document processing server. After completion of processing executed by the document processing server on the unprocessed document, the document management server acquires the processed document from the document processing server by using the external document ID, and stores the unprocessed document and the processed document in association with each other.

Thus, according to the information processing system of the present embodiment, the document management server can manage a document on which the document processing server has not executed the processing (an unprocessed document) and a document on which the document processing server has executed the processing (a processed document) in association with each other. The user of the document management server can view the unprocessed document and the processed document by operating only the document management server, enhancing operation efficiency.

Further, the information processing system according to the present embodiment acquires the processed document in response to receiving a completion notification transmitted when the document processing server completes the processing. Thus, according to the information processing system of the present embodiment, when the processing is completed by the document processing server, the processed document can be viewed on the document management server without delay.

First Modification

In the above-described embodiment, an external document ID is included in the completion notification transmitted when the document processing server 20 completes the processing, and the document management server 10 uses the external document ID to request the processed document from the document processing server 20.

In a first modification of the above-described embodiment, the completion notification transmission unit 214 included in the document processing server 20 may transmit the completion notification including the processed document. That is, in step S10, the completion notification transmission unit 214 transmits a completion notification including the external document ID and the processed document to the document management server 10. In this case, the processing of steps S11 to S13 is not executed.

With such a configuration, the information processing system according to the first modification can acquire the processed document together with the completion notification. Thus, the processing of acquiring the processed document in response to receiving the completion notification can be omitted, enhancing operation efficiency.

Second Modification

In the above-described embodiment, after the document management server 10 acquires the processed document, the document management server 10 issues a new document ID (i.e., a processed document ID) when storing the processed document in the data storage unit 100. In a second modification of the above-described embodiment, assuming that the document management server 10 and the document processing server 20 cooperate to prevent issuing redundant document IDs, the external document ID can be used as the processed document ID.

That is, the metadata stored in the data storage unit 100 includes the unprocessed document ID and the external document ID, and does not include the processed document ID. When screen information of a document browsing screen is generated, the data management unit 12 acquires an external document ID from metadata associated with a document. In a case where there is another metadata in which the external document ID is stored as an unprocessed document ID, the data management unit 12 repeatedly acquires the external document ID from the other metadata.

With such a configuration, the information processing system according to the second modification can reduce the number of document IDs stored in the data storage unit 100 in association with the document. Thus, the storage capacity required for the data storage unit 100 can be reduced.

Third Modification

In the above-described embodiment, the data management unit 12 stores the unprocessed document ID and the processed document ID in the metadata stored in the data storage unit 100, thereby storing the unprocessed document and the processed document logically in association with each other. In a third modification of the above-described embodiment, the unprocessed document and the processed document are stored physically in association with each other.

The data management unit 12 according to the third modification combines the processed document acquired from the document processing server 20 with the document identified by the external document ID included in the completion notification to have data representing association between the unprocessed document and the processed document. For example, the unprocessed document and the processed document are combined into one electronic file including the unprocessed document and the processed document as different pages in the same file.

With such a configuration, by downloading the combined document from the document management server 10, the information processing system according to the third modification enables a comparison between the unprocessed document and the processed document using a document browsing program other than the program to generate the document browsing screen.

In each of the above embodiments, the document management server 10 is an example of a data management apparatus. The document processing server 20 is an example of an information processing apparatus. The document is an example of data. The information processing system 1 is an example of a data management system. The unprocessed document is an example of first data. The processed document is an example of second data. The document ID is an example of identification information. The unprocessed document ID is an example of first identification information. The external document ID is an example of second identification information.

Each of the functions of the above-described embodiment may be implemented by one or more processing circuits or circuitry. The "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

The apparatuses or devices described in the above-described embodiment are merely one example of the plural computing environments that implement the embodiment disclosed herein. In some embodiments, each of the document management server 10 and the document processing server 20 includes a plurality of computing devices, such as a server cluster. The plurality of computing devices communicates with one another through any type of communication link including, for example, a network or a shared memory, and performs the operations described in the present disclosure.

The above-described embodiment is illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

One aspect of the present disclosure provides a data management system including a data management apparatus and an information processing terminal. The information processing terminal includes first circuitry to transmit first data to the data management apparatus via a network. The data management apparatus includes second circuitry to transmit the first data stored in a memory in association with first identification information to the information processing apparatus that executes predetermined processing on data, receive, from the information processing apparatus, second identification information added to the first data by the information processing apparatus, store the first identification information and the second identification information in the memory in association with each other, in response to completion of the predetermined processing on the first data, receive second data obtained by the information processing apparatus executing the predetermined processing on the first data and the second identification information from the information processing apparatus, and store, in the memory, the second data received from the information processing apparatus in association with the first identification information stored in association with the second identification information received from the information processing apparatus.

The invention claimed is:

1. A data management apparatus comprising circuitry configured to:

receive first data transmitted from a user terminal by an operation of a user;

create first identification information that identifies the first data;

store the first data in association with the first identification information in a memory;

transmit the first data stored in the memory in association with the first identification information via a network to an information processing apparatus that executes predetermined processing on the first data;

receive, from the information processing apparatus, second identification information that identifies the first data, the second identification information being created by the information processing apparatus;

store the first identification information and the second identification information in association with each other in the memory, both of the first identification information and the second identification information identifying the first data such that the first identification information identifies the first data in the data management apparatus and the second identification identifies the first data in the information processing apparatus;

receive a completion notification, including the second identification information, from the information processing apparatus issued in response to completion of the predetermined processing executed by the information processing apparatus on the first data in accordance with a user instruction;

in response to receiving the completion notification, transmit a data request, including the received second identification information, to the information processing apparatus;

receive second data obtained by executing the predetermined processing on the first data transmitted from the information processing apparatus based on the second identification information;

create third identification information that identifies the second data in which the predetermined processing is executed; and store, in the memory, the second data received from the information processing apparatus in association with the first identification information stored in association with the second identification information received from the information processing apparatus, the first identification information being further in association with the third identification information.

2. The data management apparatus according to claim 1, wherein the second data and the second identification information are included in a notification transmitted from the information processing apparatus in response to the completion of the predetermined processing on the first data.

3. The data management apparatus according to claim 2, wherein the circuitry is further configured to transmit, in response to a request from the user terminal, screen information for displaying information representing the first data and information representing the second data in association with each other to the user terminal.

4. The data management apparatus according to claim 1, wherein the circuitry is further configured to combine the first data and the second data into combined data and store the combined data in the memory.

5. A data management method using a data management apparatus, the method comprising:

receiving first data transmitted from a user terminal by an operation of a user;

creating first identification information that identifies the first data;

storing the first data in association with the first identification information in a memory;

transmitting the first data stored in the memory in association with the first identification information via a network to an information processing apparatus that executes predetermined processing on the first data;

receiving, from the information processing apparatus, second identification information that identifies the first data, the second identification information being created by the information processing apparatus;

storing the first identification information and the second identification information in association with each other in the memory, both of the first identification information and the second identification information identifying the first data such that the first identification information identifies the first data in the data management apparatus and the second identification identifies the first data in the information processing apparatus;

receiving a completion notification, including the second identification information, from the information processing apparatus issued in response to completion of the predetermined processing executed by the information processing apparatus on the first data in accordance with a user instruction;

in response to receiving the completion notification, transmitting a data request, including the received second identification information, to the information processing apparatus;

receiving second data obtained by executing the predetermined processing on the first data transmitted from the information processing apparatus based on the second identification information;

creating third identification information that identifies the second data in which the predetermined processing is executed; and storing, in the memory, the second data received from the information processing apparatus in association with the first identification information stored in association with the second identification information received from the information processing, the first identification information being further in association with the third identification information.

6. A non-transitory recording medium storing a plurality of program codes which, when executed by one or more processors, causes the processors to perform a method using a data management apparatus, the method comprising:

receiving first data transmitted from a user terminal by an operation of a user;

creating first identification information that identifies the first data;

storing the first data in association with the first identification information in a memory;

transmitting the first data stored in the memory in association with the first identification information via a network to an information processing apparatus that executes predetermined processing on the first data;

receiving, from the information processing apparatus, second identification information that identifies the first data, the second identification information being created by the information processing apparatus;

storing the first identification information and the second identification information in association with each other in the memory, both of the first identification information and the second identification information identifying the first data such that the first identification information identifies the first data in the data management apparatus and the second identification identifies the first data in the information processing apparatus;

receiving a completion notification, including the second identification information, from the information processing apparatus issued in response to completion of the predetermined processing executed by the information processing apparatus on the first data in accordance with a user instruction;

in response to receiving the completion notification, transmitting a data request, including the received second identification information, to the information processing apparatus;

receiving second data obtained by executing the predetermined processing on the first data transmitted from the information processing apparatus based on the second identification information;

creating third identification information that identifies the second data in which the predetermined processing is executed; and storing, in the memory, the second data received from the information processing apparatus in association with the first identification information stored in association with the second identification information received from the information processing, the first identification information being further in association with the third identification information.

7. The data management apparatus according to claim 1, wherein the first identification information is an unprocessed document ID that identifies the first data before the predetermined processing is executed by the information processing apparatus, and the third identification information is a processed document ID that identifies the second data after the predetermined processing is completed by the information processing apparatus.

8. The data management apparatus according to claim 7, wherein the second identification information is an external document ID that identifies the first data before the predetermined processing is executed by the information processing apparatus.

9. The data management apparatus according to claim 1, wherein the first data is document data.

10. The data management apparatus according to claim 1, wherein the circuitry is further configured to transmit screen information to display information that specifies the first data and the second data, in which a preview of the first data is displayed in response to a selection of the first data, and a preview of the second data is displayed in response to a selection of the second data.

11. The data management apparatus according to claim 1, wherein the circuitry is further configured to:

receive an acquisition request including the first identification information from the user terminal;

acquire the third identification information repeatedly by referring to the memory; and embed the acquired third identification information in screen information to be transmitted to the user terminal.

* * * * *